Oct. 16, 1962 V. F. BOSWELL 3,059,217
TRANSDUCER-HULL FOR UNDERWATER USE
Filed Oct. 26, 1956 2 Sheets-Sheet 1

INVENTOR.
VANCE F. BOSWELL
BY
*Eber J. Hyde*
ATTORNEY

Oct. 16, 1962 V. F. BOSWELL 3,059,217
TRANSDUCER-HULL FOR UNDERWATER USE
Filed Oct. 26, 1956 2 Sheets-Sheet 2

INVENTOR.
VANCE F. BOSWELL
BY
*Eber J. Hyde*
ATTORNEY

United States Patent Office 3,059,217
Patented Oct. 16, 1962

3,059,217
TRANSDUCER-HULL FOR UNDERWATER USE
Vance F. Boswell, Rocky River, Ohio, assignor to Clevite Corporation, Cleveland, Ohio, a corporation of Ohio
Filed Oct. 26, 1956, Ser. No. 619,915
6 Claims. (Cl. 340—5)

This invention pertains to a hull for an underwater transducer device, and more particularly pertains to such an underwater device wherein a circumferential portion of the hull is a transducer.

The United States Navy uses torpedo shaped bodies for the training of their sonar operators, the torpedo shaped bodies being targets toward which a sonar ping is directed. The target "hears" the ping and automatically sends back to the sonar operator a signal indicative of a full size submarine. For the target to receive and transmit signals it must have portions which act as receiving and transmitting transducers, and suitable electronic gear must be mounted inside the hull.

It is an object of the invention to provide a transducer which is part of a hull of an underwater device.

Another object of the invention is to provide a hull which comprises a transducer, the transducer strengthening the hull and the hull completely protecting the transducer against moisture.

A further object of the invention is to provide a tubular hull for an underwater electronic device, the hull including a circumferentially extending transducer which strengthens the hull, the tubular member protecting the transducer, and the electronic gear being mounted within the tubular member for operating the transducer and for supporting the tube against collapse due to water pressure.

For a better understanding of the present invention, together with other and further objects thereof, reference is had to the following description taken in connection with the acompanying drawings, and its scope will be pointed out in the appended claims.

With reference to the drawings there is shown in FIGURE 1 a side view of an underwater device embodying a transducer as part of its hull.

Figure 1:
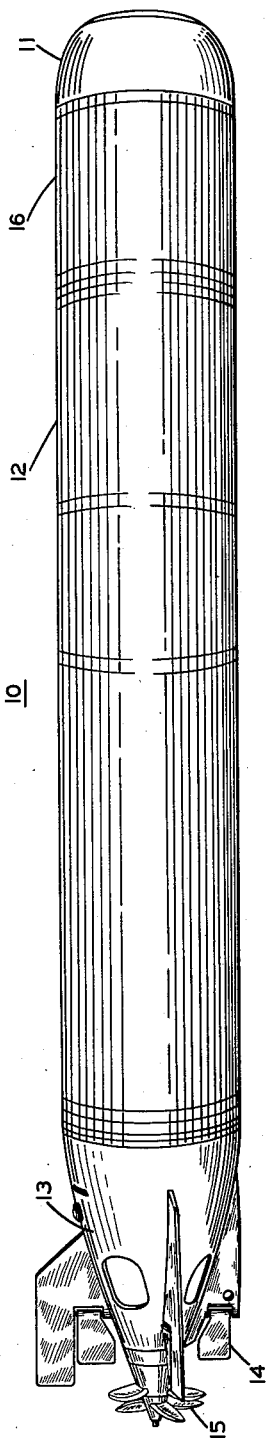
Figure 2:
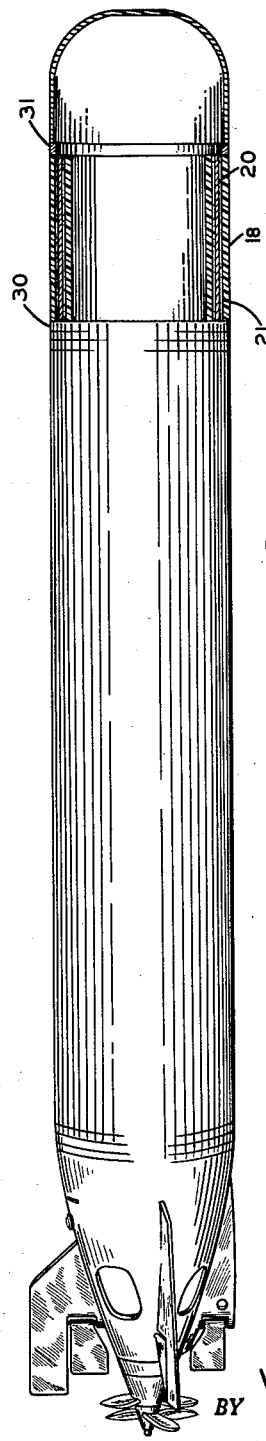
FIGURE 2 is a longitudinal view of the device shown in FIGURE 1, partly in cross-section.

With reference to the drawings there is shown in FIGURE 1 an underwater device 10 which comprises a nose section 11, a tubular body section 12, and a tail section 13 which includes rudders 14 and propellers 15.

The nose section 11 includes a hydrophone, not shown, for receiving sonar compressional waves, and it is connected to electronic gear contained within the tubular housing 12. The electronic gear, shown in FIGURE 6, receives the sonar pulse and converts it into an amplified and modified sonar signal which is transmitted away from the underwater device by means of a magnetostrictive transducer hull portion 16 which is positioned aft of the nose section 11 and which forms part of the tubular housing 12.

Figure 3:
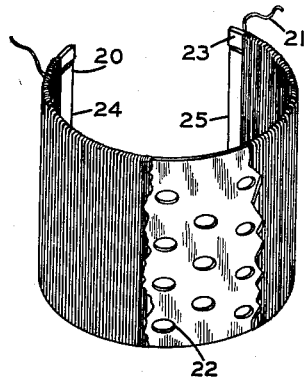
FIGURE 3 is an isometric view of a magnetostrictive device before it is cast as a portion of the hull, with a portion broken away to show its interior.
Figure 4:
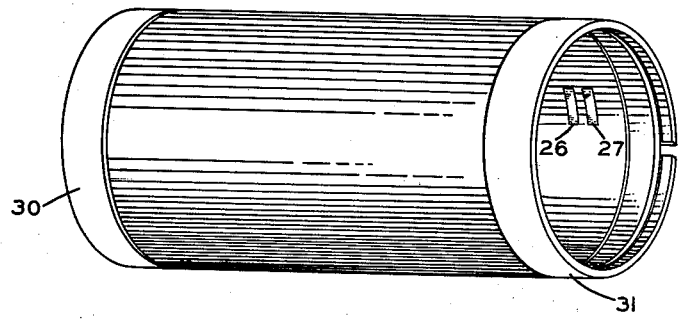
FIGURE 4 is an isometric view of the housing section which acts as a transducer.
Figure 5:
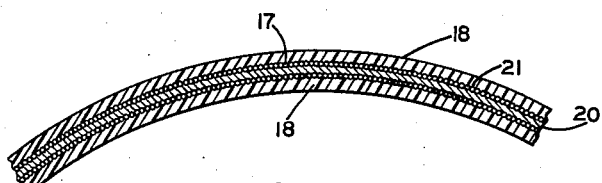
FIGURE 5 is a view of a portion of the hull section which acts as a transducer showing the transducer embedded in the hull.

The magnetostrictive unit is shown in detail in FIGURE 3. It comprises a split tube of sheet nickel 20 which is about 30 inches long, 9 inches wide and about .025 inch thick. The nickel sheet is cut with the grain of the metal parallel to the long dimension and it is formed into a slit cylinder prior to the winding operation. The nickel core is coated with an epoxy 17 resin for insulating purposes and to promote adhesion when the transducer unit is cast into the hull of the underwater device. The nickel sheet is perforated by a plurality of holes 22 to provide passages for the flow of plastic casting material 18. When the plastic material 18 is cured plastic "rivets" are formed which extend through the magnetostrictive transducer making it an integral part of the hull and eliminating the possibility of plastic delaminaton around the transducer. The winding 21 which is applied to the sheet of nickel prior to the casting operation comprises 670 turns of No. 18 double Formvar insulated wire wound toroidally on the nickel sheet at right angles to the direction in which the sheet was rolled, and insulating paper 23 is applied at the top and bottom edges of the sheet nickel to prevent shorting of the wire on the nickel in the event the sharp bends in the wire break the insulation which is on the wire After the magnetostrictive unit is made it is formed into a tube by bringing the edges 24, 25 together inside a tubular casting mandrel with the contacts 26, 27 being held so that they are exposed toward the interior of the tube. Several layers of loose glass fibers are laid between the inside wall of the casting mandrel and the outside surface of the magnetostrictive unit, and layers of the glass fibers are placed inside the unit. Liquid casting material is distributed within the unit while it is rotated to centrifugally force the plastic material through the inner layers of glass, through the holes in the nickel 20, and through the glass fibers outside the unit. End connection rings 30, 31 are simultaneously molded into the ends of the plastic section to facilitate connecting the transducer section 16 to the nose section 11 and to the other section of the underwater device. The end connections may be of the type shown, described and claimed in application Serial Number 528,160, filed August 15, 1955, in the name of Halley H. Hamlin, now issued as Patent No. 2,792,242. After the plastic material is caused to harden, the end connectors 26, 27 are connected to the free ends of the winding 21 and then they are affixed into slots machined into the inner surface of the plastic unit.

It is important that the magnetostrictive unit be completely covered with the plastic material; that is, the plastic must be inside the unit as well as outside the unit. Thus the magnetostrictive unit serves as a reinforcing member for the hull section, and the plastic material covers the wiring inside and out, protecting it from moisture and damage, the connectors 26, 27 being the only exposed part of the electrical system.

The magnetostrictive unit, FIGURE 3, when in operation expands and contracts in the radial mode, and thus when it is cast as part of the hull the hull vibrates sending out compressional waves throughout a full 360 degrees around the axis of the hull.

A further aspect of the invention lies in the manner of mounting the electronic gear within the tubular transducer member so that the electronic sub-assembly supports and strengthens the transducer section.

Figure 6:
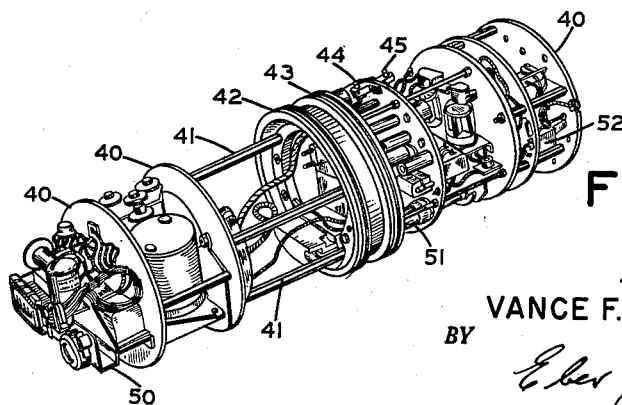
FIGURE 6 is an isometric view of the electronic gear which is mounted within the tubular hull for operating the transducer.

The electronic sub-assembly shown in FIGURE 6 comprises a plurality of bulkheads 40 held in spaced-apart relationship by a plurality of parallel rods 41. The diameter of the bulkheads is equal to the internal diameter of the tubular transducer member so that the rigidly supported bulkheads support the transducer device against crushing at great depths. The several electronic sections 50, 51, 52, etc. are individually assembled on the several bulkheads 40, and thus are held together. Also, ring units 42, 43 cooperate with the end connection rings of sections of the tubular hull 12 for coupling the sections together, and they also support the ends of the sections of the hull cooperating with the hull sections to exclude water and strengthening the hull at the joint areas where otherwise they are apt to be weak.

The electronic sub-assembly (FIGURE 6) is located inside the transducer section of the hull with the spring biased electrical contacts 44 and 45 in engagement, respectively, with contacts 26, 27 of the transducer. Thus the electronic subassembly is automatically electrically connected to the magnetostrictive unit molded within the hull of the device and the electronic section does not even have to be accurately placed with respect to the hull since contacts 26, 27 are relatively large.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A hull for an underwater transducer device comprising, in combination, tubular transducer means, tubular plastic hull means cast around the outside and the inside of said tubular transducer means forming the vibration radiating surface for said transducer, said tubular transducer means acting as a reinforcing member for said hull, the tubular transducer means and the tubular plastic hull means forming a composite tubular member, means closing both ends of said composite tubular member, and electronic signal amplifying means mounted within said composite tubular member and connected to said tubular transducer means for cooperation therewith in transducing signals.

2. A hull for an underwater transducer as set forth in claim 1, further characterized by reinforcing bulkhead means mounted across the inside of said composite tubular member, said electronic means being mounted on said reinforcing bulkhead means.

3. A hull for an underwater transducer as set forth in claim 1, further characterized by a pair of spaced apart reinforcing bulkheads mounted across the inside of said composite tubular member, said electronic means being suspended between said spaced bulkheads.

4. A hull for an underwater transducer device comprising, in combination, a tubular section formed of cast plastic material, tubular transducer means cast within said plastic material and covered inside and outside with said plastic material forming the vibration transmitting section of a composite tubular member, tubular means secured to at least one end of said composite tubular member, means closing both ends of the hull thus formed, and electronic signal amplifying means mounted within said hull and connected to said transducer means for cooperating therewith in transducing signals.

5. A hull for an underwater transducer as set forth in claim 4, further characterized by reinforcing bulkhead means mounted across the inside of said composite tubular member, and said electronic means being mounted on said reinforcing bulkhead means.

6. A hull for an underwater transducer as set forth in claim 5 further characterized by said plastic coating on the inside of said transducer means having an opening exposing said transducer means to the interior of said hull, and by electrical connector means mounted on said reinforcing bulkhead means engaging said transducer means through said opening.

References Cited in the file of this patent

UNITED STATES PATENTS

| | | |
|---|---|---|
| 2,631,271 | Thuras | Mar. 10, 1953 |
| 2,638,577 | Harris | May 12, 1953 |
| 2,708,742 | Harris | May 17, 1955 |
| 2,749,532 | Harris | June 5, 1956 |
| 2,762,032 | Vogel | Sept. 4, 1956 |
| 2,769,161 | Miller | Oct. 30, 1956 |